Nov. 8, 1949 — M. E. STECZYNSKI — 2,487,677
TAPER PIPE THREAD GAUGE
Filed July 17, 1944 — 2 Sheets-Sheet 1
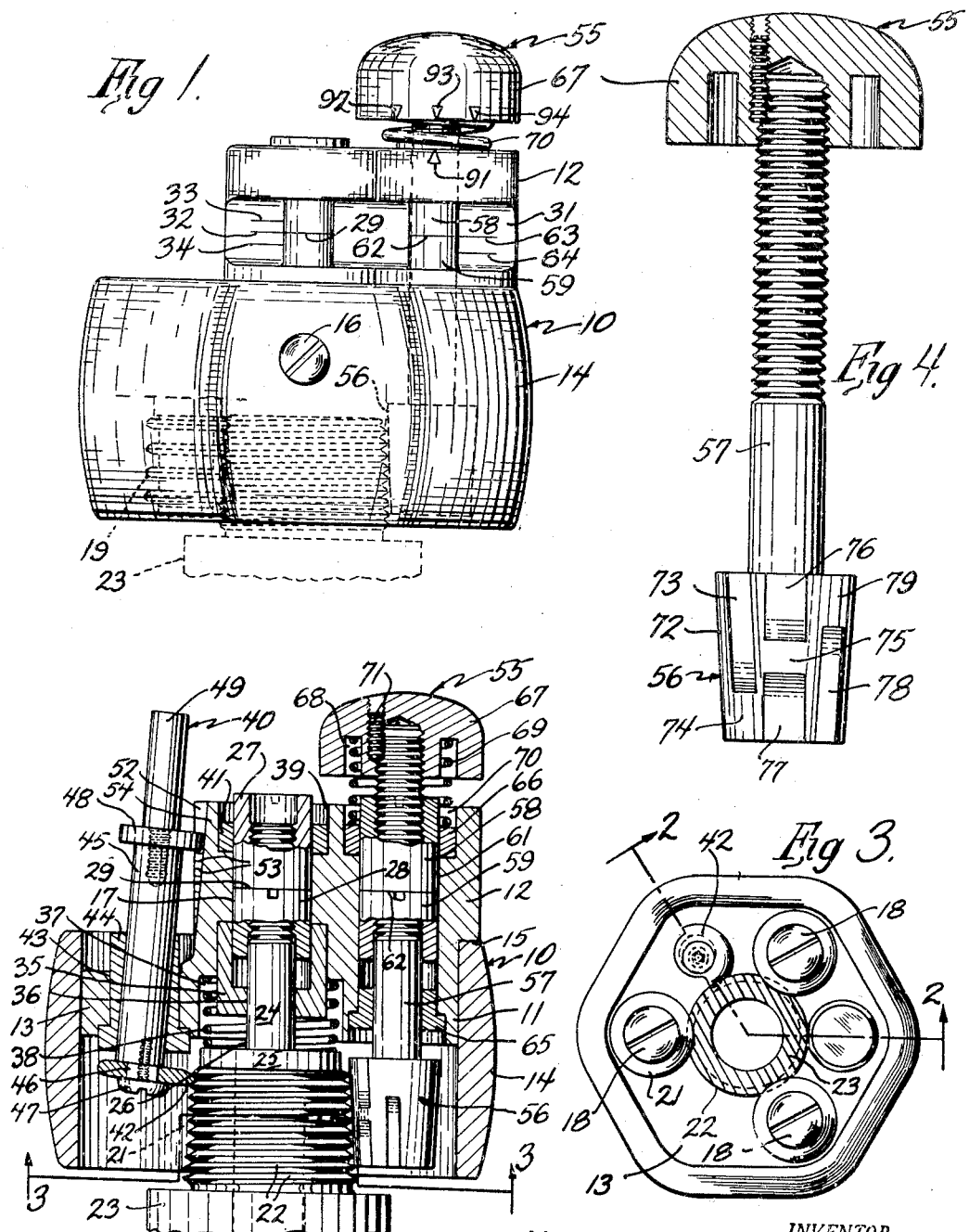
INVENTOR.
Myron E. Steczynski
BY Watson D. Harbaugh
HIS ATTORNEY Nov. 8, 1949
M. E. STECZYNSKI
2,487,677
TAPER PIPE THREAD GAUGE
Filed July 17, 1944
2 Sheets-Sheet 2
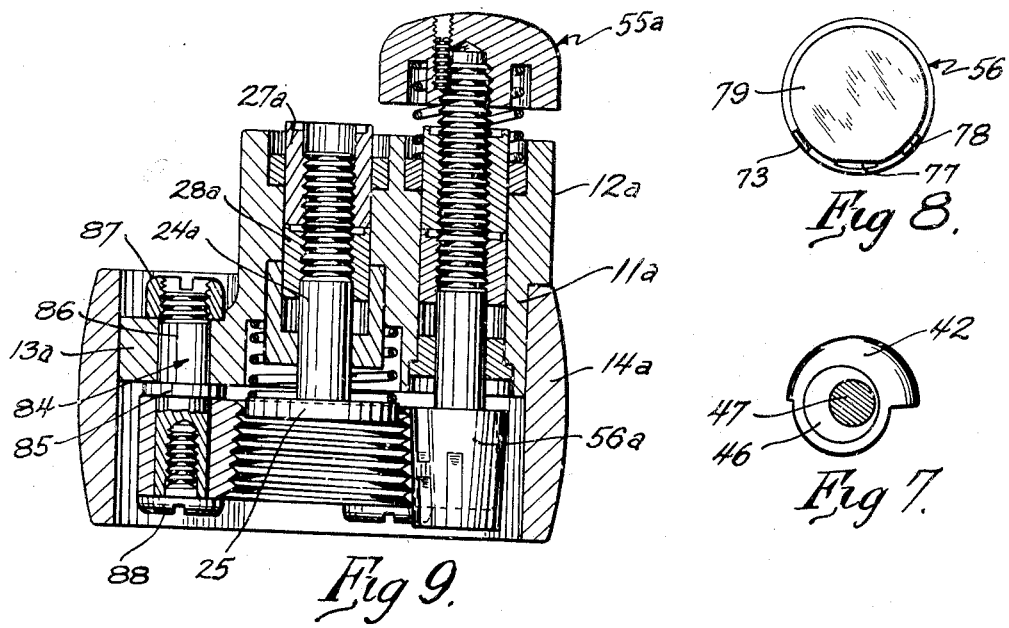
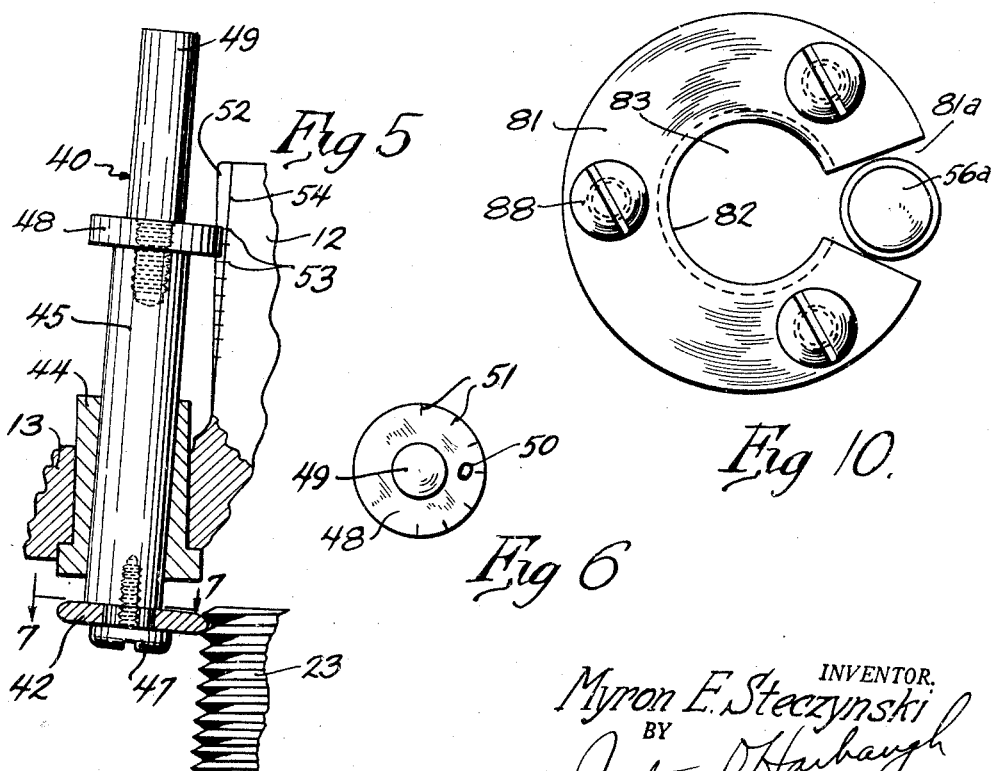
INVENTOR.
Myron E. Steczynski
BY
Watson D. Harbaugh
HIS ATTORNEY Patented Nov. 8, 1949

2,487,677

UNITED STATES PATENT OFFICE 2,487,677

TAPER PIPE THREAD GAUGE

Myron E. Steczynski, Chicago, Ill., assignor to Niles-Bement-Pond Company, West Hartford, Conn., a corporation of New Jersey Application July 17, 1944, Serial No. 545,235

7 Claims. (Cl. 33—199)

This invention relates to gauges, and more particularly to gauges useful in gauging or testing taper pipe threads, and the like, for determining the accuracy of their pitch diameters, taper and truncation of their crests for maintaining uniformity in manufacture.

One of the objects of the invention is the provision of a new and improved pipe thread diameter gauge and thread truncation gauge that will automatically indicate the relative accuracy of the pitch diameters of the individual threads of a tapered pipe thread, and simultaneously indicate the relative truncation of those threads.

Another object of the invention is the provision of a new and improved gauge that is provided with new and improved means for readjusting the parts to more nearly conform to a master or standard for indicating the screw thread characteristics.

Another object of the invention is the provision of a new and improved gauge that has means for gauging the threads on a tapered pipe thread, together with means for checking the truncation of those threads at different positions along the taper of the threads.

A further object of the invention is the provision of a new and improved gauge for checking threads on pipes, and the like, that is so constructed that by positioning the gauge on the threads to be checked the pitch diameter of the threads, and the relative truncation thereof, may be simultaneously determined without the necessity of removing the gauge from the threaded member.

A still further object of the invention is the provision of a new and improved gauge that is simple in construction, comparatively inexpensive to manufacture, efficient and substantially accurate in use, composed of few moving parts; and that the gauge may be easily applied and the accuracy of the pitch diameters, taper and truncation of the threads may be readily determined.

Other and further objects and advantages of the invention will appear from the following description, taken in connection with the accompanying drawings.

Pipe threads in air craft, marine fittings, gas cylinders, and the like, must be of fine quality and high precision to withstand the extremely high pressures and severe vibrations to which they are subjected.

Pipe thread specifications for military and civilian applications for these structures define an exact form of thread which is fuller and sharper than the customary screw-thread in order that it may form a tight seal not only along the blanks of each thread but at each crest, and the root as well. The tops and bottoms of the threads should mate, as well as the sides. If, for instance, in a construction involving a gas cylinder filled with a gas under pressure of 100 atmospheres, the flat or truncated portions of the threads of a pipe joint connected to the cylinder fail to engage the flat portions at the root of the mating threads in such joint by the thickness of a hair, the gas will escape through the spiral channel thus formed along the threads. It is, therefore, of prime importance, in certain structures, as in oxygen tank apparatus for supplying oxygen to pilots and other combatants in stratosphere flying, that the threads of the pipe joints be of a high degree of accuracy.

The required form of pipe thread can be maintained only if it can be measured and checked conveniently. Present gauges do not meet the requirements of precision pipe threads in a practical and expeditious manner. At its best two distinct gauges and two distinct gauging steps are necessary to detect and expose the variations which may exist in the pitch cone diameters or in the truncation of the threads, and in each case the second reading—the truncation—is dependent upon the first reading—the pitch diameter or cone. Since all readings are somewhat arbitrary, such as "between minimum and basic" or "nearly maximum truncation," and do not lend themselves to numerical designation, it is a mental hazard, in using the conventional gauges, to interpret the second or truncation reading in relation to the first or pitch diameter reading.

It is the object of this invention to overcome the above short-comings, and to introduce additional features which will make the gauging of taper pipe threads easier, simpler and more exact, even in the hands of a person with little or no training or skill. The system embodies the measurement of the truncation of the threads while the part being gauged is held in position for measuring the pitch diameters, thereby combining a standard form of thread gauge and a truncation gauge which may be read simultaneously. Due to its tapered form the part being checked always enters the gauge with the same diameter at the measuring position, regardless of where the end of the threaded part may be positioned. Since the pitch diameter at the gauging position never varies, the truncation reading is simplified to a direct reading, entirely independent of the thread size reading; consequently it is not necessary to take two readings in sequence where the second reading is related to, or is dependent upon, the first reading.

The indicating functions of the gauge are separate from the gauging functions for easier and more dependable reading. The thread elements of the gauge simply position the part so that the thread size at the pitch diameter is transposed in the longitudinal travel of a plunger which is indicated on a convenient scale, while a second plunger with a plain thread-engaging tapered element is brought into engagement with the crest of the threads, thereby indicating the fullness or truncation of the threads on a separate scale.

In the drawings:

Fig. 1 is a side elevation of the gauge;

Fig. 2 is a vertical section thereof taken on the planes of broken line 2—2 in Fig. 3, showing a threaded pipe in position therein to be checked;

Fig. 3 is a bottom plan view of the body portion of the device, with parts in section;

Fig. 4 is an elevation, with parts in section, showing the truncation checking member;

Fig. 5 is an elevation, on an enlarged scale, of a portion of the gauge, showing the arrangement of the pitch engaging element, with parts in section and parts broken away;

Fig. 6 is a top plan view of the indicator for the pitch engaging member;

Fig. 7 is a section of the gauge shown in Fig. 5 taken on the plane of line 7—7 of Fig. 5;

Fig. 8 is a bottom plan view of the truncated gauge element;

Fig. 9 is a section similar to Fig. 2, but showing a modified form of construction; and Fig. 10 is a view similar to Fig. 3, but showing the modified form shown in Fig. 5.

In the above mentioned drawings there has been shown but one embodiment of the invention which is now deemed preferable, but it is to be understood that changes and modifications may be made within the scope of the appended claims without departing from the spirit of the invention.

Referring now to the drawings, the reference character 10 designates the gauge, which comprises a body portion 11, having what, for convenience of description, will be termed an upwardly extending projection or restricted portion 12, and a laterally extending flange portion 13. Extending about the body portion and the flange is a casing or handle member 14, which seats against a shoulder 15 formed in the extension 12. The handle member 14 is preferably polygonal and is preferably, though not necessarily, of suitable plastic material, either thermoplastic or thermosetting, and may be a distinctive color to indicate the pitch diameter of the threads to be tested. For instance, one diameter may be blue, another red, and the like, in order to identify the size of the gauge at a glance. This member telescopes the flange and body portion, and is held in position thereon by set-screws 16 (Fig. 1). The body portion is provided with an axial opening 17, which extends upwardly through the extension 12, as shown more clearly in Fig. 2 of the drawing.

The flange 13 is provided with three openings (not shown), within which is secured a plurality of studs 18 (Fig. 3) three being shown arranged 120° apart around the axial opening 17. Mounted on the studs 18 are the gauging anvils or rolls 19, each of which has one or more annular thread engaging projections, ridges or corrugations 21 adapted to gauge the threads 22 on a tapered threaded pipe member 23 that is being tested or measured. The ridges or corrugations 21 of the rolls have their periphery tapered in cross-section to correspond with the threads 22 of the member 23, as is usual in such constructions.

Since the details of these rolls and their attachment to the flange 13 constitute no part of the present invention, it is not thought necessary to illustrate or describe the same further than to state that the rolls, if they are designed to test threads on a tapered pipe, are provided with annular corrugations or projections 21, which gradually decrease in diameter toward their lower ends for compensating for the taper of the pipe.

It will thus be seen that the gauge may be threaded on the end of the member 23 until the gauge makes a fairly tight fit for indicating the accuracy of the pitch diameters of the threads, as will now be described.

Suitable means are provided for indicating the accurate, as well as the acceptable, pitch diameters of the threads of the pipe or member that is being tested. As shown, a gauge or plunger member 24 is employed for this purpose. This member 24 comprises a head member 25, which is adapted to fit against the inner end face of the threaded pipe that is being tested, and an upwardly extending stem 26 which is threaded at its upper end. The stem 26 has attached thereto a pair of internally threaded sleeve members 27 and 28, which are threaded on said stem. These members may be adjusted and held in any desired position along the stem 26, since the two threaded sleeve members function as jam nuts.

The meeting or dividing line 29 between the two sleeve members 27, 28, constitutes an indicator element, as will presently appear. The sleeves 27 and 28 may be, and preferably are, of contrasting colors, so that the dividing line 29 between them will be clearly marked in order that the readings may be readily made. The restricted extension 12 (Fig. 1) is provided with a cut-away portion 31, which extends entirely across the extension 12, as clearly shown in said Fig. 1. This cut-away portion is of sufficient depth to expose the sleeves 27 and 28. Marked on the flat surface or bottom of the cut-away portion is a scale having three marks thereon. The central mark 32 may be marked "basic" or "normal"; the upper mark 33 may be marked "minimum," and the lower one 34 may be marked "maximum," so that the scale will indicate at a glance whether the mark 29 is in register with the scale mark 32, 33 or 34, or above or below those marks.

The parts are so calibrated that if, when the pipe is screwed into the gauge until it makes a snug fit and the mark 29 is in alinement with the mark 32, the pitch diameters of the threads as a whole are substantially accurate. If it is above the mark 33 in Fig. 1 it indicates that the pitch diameters as a whole are less than the minimum tolerance; and if it falls below the mark 34 it will show that they are greater than the maximum tolerance, and the threads being gauged will therefore be rejected.

Suitable means are provided for mounting the plunger in the opening 17. The inner end of the opening 17 is counterbored for receiving the side walls of a cup member 35, which is secured therein by friction, and the bottom wall of the cup member is provided with an axial opening 36 through which the stem 26 slidably extends, forming a sliding fit. The lower end of the opening 17 is further counterbored, as at 37, and the cup member extends downwardly into this counterbore so as to form an annular space about the same for constituting a seat for a spring 38. The upper end of the spring 38 seats against the shoulder formed by the counterbore 37, and the lower end of the spring seats against the disc member 25 to normally hold it in extended position. The upper end of the opening 17 is also counterbored, as at 39, and a bushing 41, constituting a bearing for the upper end of the plunger, is seated in this counterbore and is held by frictional resistance. It will thus be seen that by adjusting the sleeve members 27, 28, lengthwise of the stem 26 that the line 29 may be adjusted relative to the lines 32, 33 and 34.

In testing the pitch diameters of the threads as a whole, the member to be tested is screwed axially into the space defined by the rolls 21 until a snug fit is obtained corresponding to that obtained in using the standard gauge. The sleeves 27, 28, may have previously been adjusted so that the line 29 alines with the line 32 for indicating the proper relative positions of these marks when the pitch diameters are accurate.

It sometimes happens that the pitch diameter of the threads on a tapered pipe, measured as an entirety, is accurate, yet there may be certain of the threads that would not come up to standard. In order to test the accuracy of the pitch diameters of the threads individually a two-thread engaging gauge 40, having a disc-like thread engaging member 42, is employed. The flange 13 of the body portion is provided with an aperture 43, which may be parallel with the opening or aperture 17. Mounted within the aperture 43 is a bushing 44, which has an opening extending therethrough, the axis of which is parallel with the external taper of the threaded portion of the pipe 23. A gauge stem 45 is rotatably mounted in the bushing 44, and has mounted on the lower end thereof the disc-like member 42. This stem is parallel with the standard or predetermined taper of the outer edges of the threads of a standard pipe thread, as shown in Figs. 2 and 5.

The disc-like member 42 has an enlarged central opening 46, as shown more clearly in Fig. 7, and by means of a screw 47 the disc-like member 42 may be secured against the lower end of the stem 45 in adjusted position so that said member 42 will be eccentric to the axis of the stem 45. By providing the disc-like member 42 with an enlarged opening 46, the member can be eccentrically mounted without the necessity of making the disc with a cam. This arrangement greatly simplifies and facilitates the manufacture of this disc member 42.

The outer or thread-engaging edge of the segment of the member 42 is tapered to correspond with the taper of the threads to be measured. That is, they correspond to the threads of a standard pipe thread gauge. The upper end of the stem 45 is provided with a flange or head 48, and a stem extension 49 is threaded into an axial opening through the head 48 and into the stem 45. The head 48 is provided with markings or calibrations 51 (Fig. 6). A curved recess 52 is provided in the portion of the extension 12 adjacent to the head 48, to provide clearance for rotation of the latter. This curved wall is also provided with horizontal marks 53, which are spaced apart vertically a distance equivalent to the pitch or lead of the threads—there being one mark for each thread.

When it is desired to test the pitch diameter of any particular thread the member 49 is raised or lowered until the upper surface of the disc 48 alines with the mark 53, corresponding to the thread to be tested, and then the member 49 is rotated counterclockwise, as viewed in Fig. 7, until a snug fit is made between the disc 42 and two adjacent threads. For instance, if it is desired to test the accuracy of the pitch diameter of the first thread, the member 49 is lowered until the upper surface of the disc 48 is in alinement with the uppermost mark 53, after which the handle 49 is rotated counterclockwise until a snug fit is made. Then the marks at 51 and 54 will indicate the reading. If, for instance, the mark 51, indicated O, is in alinement or opposite the mark 54, the operator knows that the pitch diameter of the first thread is approximately accurate. If the O mark is at the right or left of the indicator mark 54, then the operator knows the pitch diameter of the thread being tested is inaccurate, and the position of the remaining marks 51, relative to the line 54, will indicate at a glance whether the article should be rejected or whether those inaccuracies are such as to fall within the permissible tolerances. Each of the remaining threads may be tested in the same manner. This gauge does not measure the pitch diameters of the tapered threads, but does test or indicate the accuracies and inaccuracies thereof relative to a correct or standard gauge.

In the testing of threads of tapered pipes for use where high pressure is involved, and especially high pressure gases, such as oxygen and the like, it is necessary that not only the taper of the pipe threads be substantially accurate, or at least not above or below maximum or minimum requirements, but it is also desirable to ascertain whether the truncations of the threads are substantially accurate throughout the length of the threaded portion. Due to mechanical difficulties in cutting threads they are all truncated. According to the U. S. standard, the flat portions at the crest of the threads and between the roots or bases of the threads have a definite width in relation to the pitch of the thread.

Suitable means are provided for ascertaining this truncation data after the gauge has been applied to the threaded end of the pipe. As shown more particularly in Fig. 2, this is accomplished by the use of a truncation gauge member 55, which comprises a tapered head member 56, having its side walls provided with a taper equivalent to, but reversed from, that of the threaded end of the pipe. The head 56 is provided with a stem 57, which has its upper end threaded for receiving the threaded sleeves 58, 59, which slidably engage in an opening or bore 61 extending downwardly through the upper extension 12. The threaded sleeves 58, 59, which function as jam nuts, may be adjusted along the threaded end of the stem 57 so as to raise or lower the parting line 62 between these sleeves, for properly setting the gauge to conform to a standard with which it is compared.

The member 55 is held in position by a bushing 65, extending into the lower end of the opening 61, and this opening is counterbored at its upper end, as at 70, for receiving a bushing 66 within which the sleeve 58 is slidably mounted. A knob or handle 67 is mounted on the upper threaded end of the stem 57, and is provided with an annular recess 68 for receiving the upper end of a spring 69, the lower end of which seats against the bushing 66 within the counterbore 70. The knob or handle 67 is adapted to be held in position on the stem 57 by a set-screw 71, engaging in a recess formed partly in the handle member 67 and partly in the upper screw-threaded end of the stem 57. The flat wall of the cut-away portion 31 on one side of the sleeves 58, 59, is calibrated or provided with marks 63, 64, which may be marked "full" and "truncated," respectively, as will presently appear. The spring 69 normally holds the head 56 in elevated position, so that when the gauge is in position on the threaded end of the stem 23 the operator may press the button 67 downward until the side wall of the head 56 comes in contact with the truncated ends of the threads and the reading is noted at 62, 63 and 64. If the mark 62 is in alinement with the mark 63 the taper is substantially accurate. If it is between 63 and 64 it is passable, but if it is below 64 it will be rejected because the truncation is too great to meet the requirement; that is, too much of the crests of the threads have been removed.

It will be realized that in the use of threaded pipe engagements in conditions where high pressure is involved, it may be possible that the truncation of the threads as a whole is acceptable, while at the same time the truncation of the threads on the upper or lower or intermediate portion of the threaded pipe may not come up to standard. In order to test the different portions of the threaded member the head is so constructed that it may be used to test the upper or lower or intermediate portions of the threaded pipe, separately. As shown in Fig. 4, the wall at 72 of the head 56 is an unthreaded tapered surface. The adjacent surface of the wall 72 may be flattened, as at 73, for a portion of the distance, leaving the lower portion 74 of the wall intact (Fig. 4). Likewise, the central portion 75 of an adjacent surface may have the upper and lower portions thereof flattened or removed, as at 76 and 77, thus leaving only the part 75 intact. Likewise, an adjacent surface may have a flattened portion 78 extending along its intermediate and lower end portions, leaving the upper portion 79 of the head intact.

It will thus be seen that by turning the member 55 so that the portion 72 is in contact with the crest of the threads, that the accuracy of the truncation of the threads, as a whole, will be indicated. Then, by releasing the handle member 55 and giving it a partial rotation until the surface 73 is opposite the threads and pressing the handle 55 down, the surface 74 will contact the threads farthest away from the end of the pipe. Also by releasing the handle 55, and turning the same until the surface 75 is opposite the threads, and then pressing downward on the handle 55, the reading will indicate whether the intermediate threads which are contacted by the wall 75 are accurate or within the given tolerances. Likewise, the head 79 may be given another partial turn until the flat surface 78 is opposite the threads of the pipe, and the handle, on being depressed, will bring the surface 79 into contact with the upper portion of the threads to test the accuracy of the truncation of these threads at the outer end of the pipe.

The extension 12 is provided with a marker 91, and the handle or knob 67 is provided with three markers 92, 93 and 94, for indicating the position of the gauge head. For instance, when the markers 93 and 91 are opposite each other in alinement longitudinally of the stem 57, it indicates the central section of the threads is in contact with the central portion 75 of the gauge head 56. When the markers 92 and 91 are in alinement, it indicates that the surface 74 is in engagement with the threads. Likewise, when the member 55 is turned until the markers 94 and 91 are opposite each other, it indicates that the surface 79 is in engagement with the pipe threads. Further turning of the handle will bring the surface 72 into engagement with the threads throughout the full extent of the head.

In Figs. 9 and 10 is shown a modified form of construction from that just described. In this form the gauge comprises a body portion 11ᵃ, having a restricted upper extending portion 12ᵃ and a handle member 14ᵃ, substantially like the corresponding parts of the construction shown in Fig. 1. Parts that are substantial duplicates of corresponding parts in Figs. 1 and 2 have been designated by the same reference numerals to which have been added letters to distinguish the two similar parts. The gauge or plunger member 24ᵃ, and the sleeve members 27ᵃ and 28ᵃ are likewise substantially the same as the corresponding elements shown in Fig. 2.

This form of construction differs from the form of construction shown in Figs. 1 and 2 in that a C-shaped gauge head 81, internally threaded, as at 82, and having an axial opening 83 for the reception of the threaded pipe, is employed instead of the studs and rolls 18, 19, of the previously described construction. The internally threaded gauge head 81 may be considered as an annular member, with a sector 81ᵃ removed, and is rigidly held against the body portion 11ᵃ and the flange 13ᵃ in any suitable manner. As shown, the head 81 is provided with openings arranged about the axial opening 83 in which suitable studs 84 engage for holding the parts in assembled relation.

Since the studs are all alike only one need be described. Each stud 84 has a central collar or spacing member 85, extending around the same that is adapted to engage against the lower portion of the flange or body portion of the gauge. This stud has an extension 86 threaded at its upper end for receiving a nut 87 for clamping the stud in position against the body flange 13ᵃ. The portion of the stud below the collar or flange 85 is cylindrical for engaging a corresponding opening in the C-shaped gauge member 81, and this member is clamped in position thereon by a screw 88 that engages an axial internally threaded opening in the lower end of the stud.

A truncated gauge member 55ᵃ, corresponding to the gauge member 55, is also provided. It is a substantial duplicate of that shown in Fig. 2, and for that reason it need not be described in detail. The tapered head 56ᵃ, which corresponds to the head 56 of the previous construction, is located between the ends of the C-shaped gauge head 81, as shown more clearly in Fig. 10 of the drawing. Since this head is a duplicate of the head 56 already described, it is not thought necessary to repeat the description at this point.

If it is desired to employ a gauge for testing the uniformity of the pitch diameter of the individual threads, the gauge head 81 may have another sector removed to provide clearance for this gauge, which is mounted in substantially the same manner as is shown in Fig. 5. Additional studs 84 may be employed for holding the parts of the head 81 in rigid position. After the parts are assembled in either form of construction, the same are compared with standard gauges and all necessary adjustments made, after which the gauge is ready for use.

I claim as my invention:

1. A pipe thread gauge comprising a body portion, gauging anvils thereon engaging the threads of a threaded member being gauged, a shaft mounted in said body portion with its axis parallel to the tapered periphery of said threaded member, said shaft being rotatably and slidably mounted in said body portion, a thread engaging element on said shaft adapted to be moved into and out of engagement between individual threads of the member being gauged, and cooperating markings on said body portion and shaft for indicating the uniformity of the pitch diameter of said individual threads.

2. In a pipe thread gauge, means including a plunger engaging the inner end face of a taper threaded member being gauged and having an indicator mark thereon for indicating variations in the pitch diameters of said screw threads, sleeves threaded on said plunger closely adjacent each other, whereby the line of separation of said sleeves will form said indicator mark, and means for adjusting the positions of said sleeves and mark relative to the end face of said plunger.

3. In a pipe thread gauge, means including a pipe engaging plunger having an indicator mark thereon for indicating the relative accuracy of screw-thread characteristics, said mark being the parting line between two sleeves threaded onto said plunger in jam-nut relationship, whereby said mark may be shifted along said plunger by shifting said sleeves therealong.

4. A screw thread gauge comprising a body portion, means for holding a taper threaded member axially within said body portion, a truncation gauge member slidably mounted on said body portion and having a plurality of vertically spaced conical thread engaging portions for indicating variations of the truncation of said threads at differently spaced points along said threads, said member being normally held in inoperative position, and means for moving said member into engagement with said threads.

5. A pipe thread gauge comprising a body portion having an opening therethrough, rolls arranged around said opening, said rolls each having a thread engaging ridge extending transversely thereof, a spring-pressed plunger having a stem extending through said body portion axially of the space surrounded by said rolls and adapted to engage the end face of a threaded member being gauged, said body portion having a section exposing a section of said stem, cooperating markings on said casing and stem for indicating the pitch diameters of said threads as a group, and means for testing variations of the pitch diameters of the individual threads when the member being gauged is in the position determined by said thread engaging rolls.

6. A pipe thread gauge comprising a body portion having an opening therethrough, rolls having thread engaging ridges thereon surrounding said opening, said rolls having external thread engaging peripheral projections extending radially therefrom and adapted to engage threads of a standard taper thread, a plunger having surfaces for engaging the crests of the threads being gauged, means for yieldingly biasing said plunger inwardly, and means including a second plunger having a member engaging the crests of the threads being gauged for simultaneously indicating the relative conformity of the pitch diameter and relative truncation of said threads to predetermined standards when the member being gauged is in the position determined by said thread engaging rolls.

7. In a pipe thread gauge, means including a plunger adapted to engage the threads being gauged having an indicator mark thereon for indicating the relative accuracy of screw-thread characteristics, said mark being the parting line between two sleeves threaded onto said plunger in jam nut relationship, whereby said mark may be shifted along said plunger by shifting said sleeves therealong.

MYRON E. STECZYNSKI.

REFERENCES CITED

The following references are of record in the file of this patent:

UNITED STATES PATENTS

| Number | Name | Date |
|---|---|---|
| 785,739 | Kettnich | Mar. 28, 1905 |
| 1,459,896 | John | June 26, 1923 |
| 1,543,244 | Blood | June 23, 1925 |
| 1,549,635 | Vokal | Aug. 11, 1925 |
| 2,200,885 | Johnson | May 14, 1940 |
| 2,218,111 | Johnson | Oct. 15, 1940 |
| 2,339,699 | Husband | Jan. 18, 1944 |

FOREIGN PATENTS

| Number | Country | Date |
|---|---|---|
| 279,491 | Great Britain | Oct. 21, 1927 |
| 398,178 | Great Britain | Sept. 6, 1933 |